(12) United States Patent
Gong

(10) Patent No.: US 10,340,650 B2
(45) Date of Patent: Jul. 2, 2019

(54) NEAR-FIELD ELECTRON LASER

(71) Applicant: Bingxin Gong, Guangdong (CN)

(72) Inventor: Bingxin Gong, Guangdong (CN)

( * ) Notice: Subject to any disclaimer, the term of this patent is extended or adjusted under 35 U.S.C. 154(b) by 0 days.

(21) Appl. No.: 15/964,133

(22) Filed: Apr. 27, 2018

(65) Prior Publication Data

US 2018/0248331 A1 Aug. 30, 2018

Related U.S. Application Data

(63) Continuation of application No. PCT/CN2016/102227, filed on Oct. 14, 2016.

(30) Foreign Application Priority Data

Oct. 27, 2015 (CN) .......................... 2015 1 0740510

(51) Int. Cl.
  *H01S 3/09* (2006.01)
  *H01S 4/00* (2006.01)
  *H01S 3/094* (2006.01)

(52) U.S. Cl.
  CPC ............ *H01S 3/0903* (2013.01); *H01S 3/094* (2013.01); *H01S 4/00* (2013.01)

(58) Field of Classification Search
  CPC ............ H01S 3/0903; H01S 3/094; H01S 4/00
  See application file for complete search history.

(56) References Cited

PUBLICATIONS

Bingxin Gong, The light controlled fusion, Annals of Nuclear Energy, 2013, pp. 57-60, vol. 62.

*Primary Examiner* — Armando Rodriguez

(57) ABSTRACT

A near-field electron laser includes a light source and a sealed container. The interior of the sealed container is filled with an electron gas, the light source produces incident light, under the irradiation of the incident light, electrons will be forced to vibrate, and emit secondary electromagnetic waves, so that the vibrating electrons are in the near-field of each other; the incident light causes an attractive force to be produced among the vibrating electrons, and under the action of the electric field intensity of the incident light and the attractive force, the electrons will vibrate in the same radial straight line and in the same direction, and have a constant frequency, amplitude, and phase difference; the interference effects of the radiation of the vibrating electrons are used to obtain a stronger directionality and intensity to form a laser light.

2 Claims, 1 Drawing Sheet

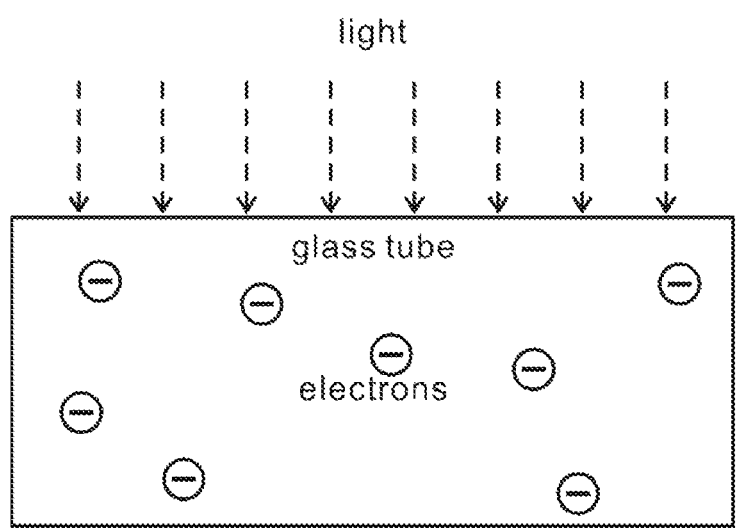

NEAR-FIELD ELECTRON LASER

CROSS REFERENCE TO RELATED APPLICATIONS

The present application is a Continuation Application of PCT Application No. PCT/CN2016/102227 filed on Oct. 14, 2016, which claims the benefit of Chinese Patent Application No. 201510740510.7 filed on Oct. 27, 2015. All the above are hereby incorporated by reference.

TECHNICAL FIELD

This near-field electron laser is produced from the near-field energy of vibrating electrons, comprising a light source and a sealed container. The interior of the sealed container is filled with an electron gas, the light source produces incident light, under the irradiation of the incident light, electrons will be forced to vibrate and behave similarly to vibrating electric dipoles, and emit secondary electromagnetic waves, so that the average distance between the electrons in the sealed container is much smaller than the wavelength of the incident light, and the vibrating electrons are in the near-field of each other; the incident light causes an attractive force to be produced among the vibrating electrons, and under the action of the electric field intensity of the incident light and the attractive force, the electrons will vibrate in the same radial straight line and in the same direction, and have a constant frequency, amplitude, and phase difference, which is similar to an antenna array that is formed by the equidistant arrangement of N identical antennas in a radial direction; the interference effects of the radiation of the vibrating electrons are used to obtain a stronger directionality and intensity to form a laser light, and the intensity and directionality of the laser light depend on the amplitude and frequency of the incident light and the number of electrons in the sealed container.

BACKGROUND ART

Free electron laser has an insufficient coherence. Conventional lasers require complex lenses and cooling system.

SUMMARY OF THE INVENTION

To resolve the above problem, the present invention provides a near-field electron laser. This near-field electron laser is produced from the near-field energy of vibrating electrons, comprising a light source and a sealed container. The working medium of the laser is electron. The interior of sealed container is filled with an electron gas, the light source produces an incident light, under the irradiation of the incident light, electrons will be forced to vibrate and behave similarly to vibrating electric dipoles, and emit secondary electromagnetic waves, so that the average distance between the electrons in the sealed container is much smaller than the wavelength of the incident light, and the vibrating electrons are in the near-field of each other; when the electric field intensity direction of the incident light and the electric moments of two vibrating electrons are in the same radial straight line and in the same direction, there exists a radial attractive force among the vibrating electrons; under the action of the radial attractive force, the electrons will vibrate in the same radial straight line and in the same direction, and have a constant frequency, amplitude, and phase difference, which is similar to an antenna array that is formed by the equidistant arrangement of N identical antennas along a polar axis; the interference effects of the radiation of the vibrating electrons are used to obtain a stronger directionality to form laser light.

This near-field electron laser is based on the following principles:

Electrons are negatively charged, under the irradiation of incident light, the electrons will perform a simple harmonic motion, wherein the simple harmonic motions of the electrons can be considered as vibrating electric dipoles, and will emit secondary electromagnetic waves.

When the electric field intensity direction of the incident light and the electric moments of two vibrating electric dipoles are in the same radial straight line and are in the same direction, there exists a mutual-attracting radial acting force among the two vibrating electric dipoles, that is, there exists a mutual-attracting radial acting force among the two vibrating electrons. (Reference document 1).

Assuming that the incident light is produced by a low speed accelerating charge and assuming that the low speed accelerating charge has a charge amount of Q, an amplitude of a, and a frequency of $\omega$, then a radiated electric field of this vibrating electric dipole is $\vec{E(t)}$:

$$\vec{E(t)} = \frac{Qa}{4\pi\varepsilon_0 c^2 R} \omega^2 \cos \omega t \qquad (1)$$

where $\varepsilon_0$ is a vacuum dielectric constant, c is a vacuum light speed, and R is the distance from an observation point to the centre of the vibrating electric dipole.

Let $$A = \frac{Qa}{4\pi\varepsilon_0 c^2 R} \qquad (2)$$

then formula (1) becomes $$\vec{E(t)} = A\omega^2 \cos \omega t \qquad (3)$$

The electric field intensity $\vec{E(t)}$ will cause an electron to be forced to vibrate and behave similarly to a vibrating electric dipole that has a vibration frequency equal to the frequency $\omega$ of the incident light and emits a secondary electromagnetic wave.

Assuming that a vibration electron 1 has a charge amount of $q_e$ and an amplitude of $l_1$. In a spherical coordinate system, the near-field electric field intensity and the magnetic field intensity of the vibrating electron 1 are respectively:

$$\vec{E_r(t)} = \frac{q_e l_1 \cos\theta}{2\pi\varepsilon_0 r^3} \cos \omega t \vec{r} \qquad (4)$$

$$\vec{E_\theta(t)} = \frac{q_e l_1 \sin\theta}{4\pi\varepsilon_0 r^3} \cos \omega t \vec{\theta} \qquad (5)$$

$$\vec{H_\phi(t)} = \frac{\omega q_e l_1 \sin\theta}{4\pi r^2} \cos\left(\omega t + \frac{\pi}{2}\right) \vec{\phi} \qquad (6)$$

where r is the distance from an observation point to the centre of the vibrating electron 1, where $r \gg l_1$, $r \ll \lambda$, and $\lambda$ is the wavelength of the incident light.

Assuming that a vibrating electron 2 is at the observation point, the distance between the vibrating electron 1 and the vibrating electron 2 is therefore r. When the electric field intensity $\vec{E(t)}$ is in the direction of $\vec{r}$, θ=0, and formulas (4), (5), and (6) become $$E_r(t) = \frac{q_e l_1}{2\pi\varepsilon_0 r^3}\cos\omega t \vec{r} \quad (7)$$

$$\vec{E_\theta(t)} = 0 \quad (8)$$

$$\vec{H_\phi(t)} = 0 \quad (9)$$

The vibrating electron 2 performs a simple harmonic forced vibration under the action of the electric field intensities of $\vec{E(t)}$ and $\vec{E_r(t)}$, and has a vibration frequency equal to the frequency ω of the incident light, and will emit a secondary electromagnetic wave. Assuming that the vibrating electron 2 has a mass of $m_e$, a charge amount of $q_e$, and an amplitude of $l_2$, then the formula of motion of the vibrating electron 2 in the direction of $\vec{r}$ is:

$$\ddot{x} + \gamma\dot{x} + \omega_0^2 x = q_e A\omega^2 \cos\omega t \vec{r} + \frac{q_e q_e l_1}{2\pi\varepsilon_0 r^3}\cos\omega t \vec{r} \quad (10)$$

where $\omega_0$ is the intrinsic frequency of the vibrating electron 2, and γ is a damping coefficient.

$$\gamma = \frac{q_e^2 \omega^2}{6\pi\varepsilon_0 m_e c^3} \quad (11)$$

Because γ<<ω; therefore $$x = \frac{q_e}{m_e}\frac{1}{\sqrt{(\omega_0^2 - \omega^2)^2 + \omega^2\gamma^2}}\left(A\omega^2 + \frac{q_e l_1}{2\pi\varepsilon_0 r^3}\right)\cos\omega t \vec{r} \quad (12)$$

$$= l_2 \cos\omega t \vec{r}$$

$$l_2 = \frac{q_e}{m_e}\frac{1}{\sqrt{(\omega_0^2 - \omega^2)^2 + \omega^2\gamma^2}}\left(A\omega^2 + \frac{q_e l_1}{2\pi\varepsilon_0 r^3}\right) \quad (13)$$

Because the vibrating electron 2 can be considered as a vibrating electric dipole, the electric dipole moment of the vibrating electron 2 is defined as $\vec{P_2}$ and is in the direction of $\vec{r}$. Then, $$\vec{P_2} = q_e l_2 \cos\omega t \vec{r} \quad (14)$$

$$= \frac{q_e^2}{m_e}\frac{1}{\sqrt{(\omega_0^2 - \omega^2)^2 + \omega^2\gamma^2}}\left(A\omega^2 + \frac{q_e l_1}{2\pi\varepsilon_0 r^3}\right)\cos\omega t \vec{r}$$

The electric field intensity $\vec{E(t)}$ does not depend on the distance r, and therefore will not exert a force in the direction of $\vec{r}$ on the vibrating electron 2.

The near-field electric field intensity $\vec{E_r(t)}$ of the vibrating electron 1 will exert a force $F_N$ in the direction of $\vec{r}$ on the vibrating electron 2, and the electric field intensity $\vec{E(t)}$ and the electric moments of the vibrating electron 1 and the vibrating electron 2 are in the line of $\vec{r}$ and are in the same direction.

$$F_N = q_e l_2 \cos\omega t (\vec{r}\cdot\nabla\vec{E_r(t)} = \vec{P_2}\cdot\nabla\vec{E_r(t)}) \quad (15)$$

where $\nabla = r\frac{\partial}{\partial r}$.

$$F_N = -\frac{1}{\sqrt{(\omega_0^2-\omega^2)^2+\omega^2\gamma^2}}\left(\frac{3Aq_e^2 q_e l_1 \omega^2 \cos^2\omega t}{4m_e\pi\varepsilon_0 r^4} + \frac{3q_e^2}{8m_e}\frac{q_e^2 l_1^2 \cos^2\omega t}{\pi^2\varepsilon_0^2 r^7}\right)\vec{r} \quad (16)$$

From formula (16), it can be known that there exists r an attractive force $F_N$ in N the direction among the vibrating electron 1 and the vibrating electron 2 in the near-field.

There exists a Coulomb repulsive force $F_C$ among the electron 1 and the electron 2:

$$F_C = \frac{q_e^2}{4\pi\varepsilon_0 r^2}\vec{r} \quad (17)$$

In a rectangular coordinate system, the attractive force $F_N$ among the vibrating electron 1 and the vibrating electron 2 is expressed as:

$$F_{Nx} = F_N \sin\theta\cos\phi\vec{x} \quad (18)$$

$$F_{Ny} = F_N \sin\theta\sin\phi\vec{y} \quad (19)$$

$$F_{Nz} = F_N \cos\theta\vec{z} \quad (20)$$

In a rectangular coordinate system, the Coulomb repulsive force $F_C$ among the electron 1 and the electron 2 is expressed as:

$$F_{Cx} = F_C \sin\theta\cos\phi\vec{x} \quad (21)$$

$$F_{Cy} = F_C \sin\theta\sin\phi\vec{y} \quad (22)$$

$$F_{Cz} = F_C \cos\theta\vec{z} \quad (23)$$

Because electrons are quite small, the electrons can be regarded as mass points, except the moment of collision, the interaction between electrons is negligible, and the electron gas can be considered as an ideal gas, therefore, there is a following relation for the pressure intensity P:

$$P = m_e \sum_i n_i V_{ix}^2 = nk_B T \quad (24)$$

where P is the pressure intensity, n is the total number of electrons, $m_e$ is an electron mass, $k_B$ is the Boltzmann constant, T is the absolute temperature, $n_i$ is the number of electrons that have a velocity between $V_i$ and $V_i + dV_i$, and $V_{ix}$ is the X-axis component of $V_i$.

Because $$\frac{dP}{dT} = \frac{dP}{dt}\cdot\frac{dt}{dT} = nk_B \quad (25)$$

-continued $$\frac{dP}{dt} = 2m_e \sum_i n_i V_{ix} \frac{dV_{ix}}{dt} \quad (26)$$

$$\frac{dV_{ix}}{dt} = \frac{F_x}{m_e} \quad (27)$$

therefore, there is $$\frac{dP}{dt} = 2 \sum_i n_i V_{ix} F_x \quad (28)$$

$$\frac{dT}{dt} = \frac{2 \sum_i n_i V_{ix} F_x}{nk_B} \quad (29)$$

$$F_x = F_{Nx} + F_{Cx} = \frac{q_e^2}{4\pi\varepsilon_0 r^2} \sin\theta\cos\phi - \frac{1}{\sqrt{(\omega_0^2 - \omega^2)^2 + \omega^2\gamma^2}} \left( \frac{3A_e^2 q_e l_1 \omega^2}{4m_e\pi\varepsilon_0 r^4} + \frac{3q_e^2}{8m_e} \frac{q_e^2 l_1^2}{\pi^2\varepsilon_0^2 r^7} \right) \sin\theta\phi\cos^2\omega t \quad (30)$$

A, $\omega$, and $n_d$ can all be controlled, $$r \sim n_d^{1/3} \quad (31)$$

where $n_d$ is the electron number density.

For example, when $\omega=10^{14}$ Hz, $A=10^{-13}$ N·S²/C, $A\omega^2=10^{15}$ N/C $\lambda=1.884*10^{-5}$ m, $r=10^{-10}$ m, and $l_1=10^{-15}$, there is $$\frac{3A q_e^2 q_e l_1 \omega^2}{4m_e\pi\varepsilon_0 r^4} \gg \frac{3q_e^2}{8m_e} \frac{q_e^2 l_1^2}{\pi^2\varepsilon_0^2 r^7} \quad (32)$$

Because except the moment of collision, the interaction between electrons is negligible, this means that the electrons are approximately free electrons, and $\omega_0 \approx 0$. When $\omega \gg \omega_0$.

$$F_x \approx \frac{q_e^2}{4\pi\varepsilon_0 r^2} \sin\theta\cos\phi - \frac{3A q_e^2 q_e l_1}{4m_e\pi\varepsilon_0 r^4} \sin\theta\cos\phi\cos^2\omega t \quad (33)$$

$$\int_{V_{ix0}}^{V_{ix}} dV_{ix} = \frac{1}{m_e} \int_0^t F_x dt \quad (34)$$

$$\int_{P_0}^{P} dP = 2 \sum_i n_i V_{ix} \int_0^t F_x dt \quad (35)$$

$$\int_{T_0}^{T} dT = \frac{2 \sum_i n_i V_{ix}}{nk_B} \int_0^t F_x dt \quad (36)$$

By integrating formulas (34), (35), and (36), because $$\int_0^t \cos^2\omega t \, dt = \frac{1}{\omega}\left(\frac{\omega t}{2} + \frac{1}{4}\sin 2\omega t\right) \approx \frac{t}{2} \quad (37)$$

$$V_{ix} - V_{ix0} = \frac{1}{m_e}\left(\frac{q_e^2 t}{4\pi\varepsilon_0 r^2}\sin\theta\cos\phi - \frac{3A q_e^2 q_e l_1 t}{8m_e\pi\varepsilon_0 r^4}\sin\theta\cos\phi\right) \quad (38)$$

$$P - P_0 = 2\sum_i n_i V_{ix}\left(\frac{q_e^2 t}{4\pi\varepsilon_0 r^2}\sin\theta\cos\phi - \frac{3A q_e^2 q_e l_1 t}{8m_e\pi\varepsilon_0 r^4}\sin\theta\cos\phi\right) \quad (39)$$

$$T - T_0 = \frac{2\sum_i n_i V_{ix}}{nk_B}\left(\frac{q_e^2 t}{4\pi\varepsilon_0 r^2}\sin\theta\cos\phi - \frac{3A q_e^2 q_e l_1 t}{8m_e\pi\varepsilon_0 r^4}\sin\theta\cos\phi\right) \quad (40)$$

when $\omega=10^{14}$ Hz, $A=10^{-13}$ N·S²/C, $r=10^{-10}$ m, and $l_1=10^{-15}$ m, there is $$\frac{3A q_e l_1}{2m_e r^2} > 1 \quad (42)$$

$$V_{xi} - V_{ix0} < 0 \quad (43)$$

$$P - P_0 < 0 \quad (44)$$

$$T - T_0 < 0 \quad (45)$$

The pressure and temperature of the electron gas will drop, and the average kinetic energy of the electrons for thermal motion will also decrease.

When $$t = V_{ix0} \bigg/ \frac{1}{m_e}\left(\frac{3A q_e^2 q_e l_1}{8m_e\pi\varepsilon_0 r^4}\sin\theta\cos\phi - \frac{q_e^2}{4\pi\varepsilon_0 r^2}\sin\theta\cos\phi\right) \quad (46)$$

there is $$V_{ix} = 0, P = 0, T = 0 \quad (47)$$

Because $$V_x^2 = \frac{\sum_i n_i V_{ix}^2}{n} \quad (48)$$

therefore, there is $$V_x = 0 \quad (49)$$

Similarly, there is $$V_y = 0 \quad (50)$$

$$V_z = 0 \quad (51)$$

When the irregular microscopic velocity and resistance of the electrons drop to zero, the electrons will no longer collide with each other and will no longer hit the wall of the sealed tube.

When the velocity of the electrons drops to zero, because the attractive force $F_N$ is greater than the Coulomb repulsive force $F_C$, the distance between the electrons will decrease until the attractive force $F_N$ equals the Coulomb repulsive force $F_C$. At this time, the electrons are subjected to the electric field intensity of the incident light and the radial attractive force $F_N$ of the near-field, and these electrons will vibrate in the same radial straight line and in the same direction. Because the incident light is parallel monochromatic light, the frequency, amplitude, and phase difference of these vibrating electrons are constant, which is similar to an antenna array that is formed by the equidistant arrangement of N identical antennas in a radial direction. The interference effects of the radiation of the antennas are used to obtain a stronger directionality to form the laser light. (Reference document 2)

Since the vibrating electron 1 and the vibrating electron 2 have equal masses and charges, the vibrating electron 1 and the vibrating electron 2 can be interchanged, therefore, the amplitudes of the vibrating electron 1 and the vibrating electron 2 are equal, and similarly, it can be known that the vibrating electrons in the sealed vessel all have equal amplitudes, $$l_n = l_{n-1} = \ldots = l_2 = l_1 = l \tag{52}$$

where $l_n$ is the amplitude of the vibrating electron n, and $l_{n-1}$ is the amplitude of the vibrating electron n-1.

In a far-field, the electric field intensity of the vibrating electron 1 is $E_0$, where $$E_0 = \frac{q_e l}{4\pi\varepsilon_0 c^2 R}\omega^2 \sin\theta \cos\omega\left(t - \frac{R}{c}\right) = A' \cos\omega\left(t - \frac{R}{c}\right) \tag{53}$$

$$A' = \frac{q_e l}{4\pi\varepsilon_0 c^2 R}\omega^2 \sin\theta \tag{54}$$

The phase difference between the radiated far field fields of the vibrating electrons is kr cos θ, therefore, the total radiated electric field is E, $$E = \sum_{m=0}^{n-1} E_0 e^{imkr\cos\theta} = E_0 \frac{1 - e^{inkr\cos\theta}}{1 - e^{ikr\cos\theta}} \tag{55}$$

where k is the number of circular waves, where k=1, 2, 3 . . . , and r is the distance between the vibrating electrons. The radiation intensity can be expressed as I, $$I = \frac{1}{\mu_0 c}E^2 = \frac{1}{\mu_0 c}A'^2\left|\frac{1-e^{inkr\cos\theta}}{1-e^{ikr\cos\theta}}\right|^2 = \frac{1}{\mu_0 c}A'^2 \frac{\sin^2(nkr\cos\theta/2)}{\sin^2(kr\cos\theta/2)} \tag{56}$$

thus the angular distribution is the angular distribution of each vibrating electron multiplied by the factor $$\left|\frac{1-e^{inkr\cos\theta}}{1-e^{ikr\cos\theta}}\right|^2 = \frac{\sin^2\left(\frac{n}{2}kr\cos\theta\right)}{\sin^2\left(\frac{1}{2}kr\cos\theta\right)} \tag{57}$$

In the formula, when $$nkr\cos\theta = 2m\pi, m=\pm 1, \pm 2 \tag{58}$$

there are zeros and the radiation along these directions is zero. The angular distribution is divided into several lobes, and the radiant energy is mainly concentrated in a main lobe. Let $$\psi = \frac{\pi}{2} - \theta,$$

the opening angle ψ of the main lobe is determined by the following formula:

$$nkr\sin\psi = 2\pi \tag{59}$$

that is $$\sin\psi = \frac{\lambda}{nr} \tag{60}$$

when $$nr \gg \lambda \tag{61}$$

that is, when the product of the number of electrons in the sealed container and the distance between the electrons is much greater than the wavelength, and highly directional radiation can be obtained.

Because $$r \sim n_d^{1/3} \tag{62}$$

therefore, when $$nn_d^{1/3} \gg \lambda \tag{63}$$

highly directional radiation can be obtained, that is, increasing the number of electrons in the sealed container can enhance the directionality of radiation.

According to the above principle of the near-field electron laser, the sealed tube is evacuated first to remove impurities in the sealed tube so that the pressure in the sealed tube is lower than 1 $P_a$, and then the electron gas is injected; during the injection of the electron gas, the electron gas is irradiated with light to produce an attractive force among the vibrating electrons and facilitate the injection of the electron gas. The sealed tube is made of glass or plastic.

After the interior of the sealed tube is filled with the electron gas, the average distance between the electrons in the sealed tube is much smaller than the wavelength of the incident light, and the electron number density is much greater than the negative third power of the wavelength of the incident light, so that the vibrating electrons are in the near-field of each other; the light source produces the incident light, and the incident light may be laser or may be parallel monochromatic light.

The electrons are irradiated with the incident light, so that an attractive force is produced among the vibrating electrons, and the radial attraction between the vibrating electrons is controlled by controlling the charge amount and amplitude of an accelerating charge that produces the incident light and the distance between the light source and the vibrating electrons, so that the average kinetic energy of the electrons for thermal motion is reduced to nearly zero and cause the electrons to vibrate in the same radial straight line and in the same direction; and because the incident light is parallel monochromatic light, these vibrating electrons have a constant frequency, amplitude, and phase difference, which is similar to an antenna array that is formed by the equidistant arrangement of N identical antennas in a radial direction, and the interference effects of the radiation of the vibrating electrons are used to obtain a stronger directionality and intensity to form the laser light.

The radiation intensity and directionality of the laser can be enhanced by increasing the frequency of the incident light, increasing the charge amount and amplitude of the accelerating charge that produces the incident light, decreasing the distance between the vibrating electrons and the accelerating charge that produces the incident light, and increasing the number of vibrating electrons.

The laser light can also be produced by causing the electrons to collide to enter the near-field of each other and then irradiating the colliding electrons with the incident light. The working medium may also be other charged particles.

BRIEF DESCRIPTION OF THE DRAWINGS

The sole FIGURE is a schematic diagram of the near-field electron laser according to an embodiment of the present application.

DETAILED DESCRIPTION OF EMBODIMENTS

A specific embodiment is described below, but specific implementations are not limited to this example.

Referring to the FIGURE, if there is air inside a sealed container, the thermal kinetic energy of molecules in the air will affect the radiation intensity and directionality of a laser, therefore, the sealed container needs to be evacuated first so that the pressure in the sealed container is lower than 1 $P_a$. After the vacuum is evacuated, an electron gas is injected, and during the injection of the electron gas, the electron gas is irradiated with light to produce an attractive force among vibrating electrons and facilitate the injection of the electron gas.

To cause the vibrating electrons to be in the near-field of each other, the average distance between the electrons in the sealed container should be much smaller than the wavelength $r \ll \lambda$ of the incident light. Because there is the following relationship between the average distance r between the electrons and the electron number density $n_d$:

$$r \sim n_d^{1/3} \tag{62}$$

Therefore, there is the following relationship between the electron number density $n_d$ and the wavelength $\lambda$ of incident light:

$$n_d \gg \lambda^{-3} \tag{64}$$

That is, the electron number density is much greater than the negative cubic of the wavelength of the incident light. A required number of electrons can be known from the wavelength of the incident light.

Because electrons are produced from gas ionization, a hydrogen molecule contains 2 electrons, and there are $6.023 \times 10^{23}$ hydrogen molecules per mole of hydrogen, the number of moles of hydrogen that need to be ionized can be known from the wavelength of the incident light.

Because the interior of the sealed container is filled with the electron gas, the sealed container should be made of glass or plastic. The sealed tube is wrapped with a heat insulation material outside.

After the electron gas is injected, the electrons are irradiated with the incident light so that the vibrating electrons are in the near-field of each other, and the electric field intensity direction of the incident light and the electric moments of the vibrating electron are in the same radial straight line and in the same direction. The radiation intensity and directionality of the laser can be enhanced by increasing the frequency of the incident light, increasing the charge amount Q and amplitude α of the accelerating charge that produces the incident light, decreasing the distance between the vibrating electrons and the accelerating charge that produces the incident light, and increasing the number of vibrating electrons.

REFERENCE DOCUMENTS

1. BingXin Gong, 2013, The light controlled fusion, Annals of Nuclear Energy, 62 (2013), 57-60.
2. Guo Shuohong, Electrodynamics, Second Edition, Higher Education Press, 210-211.

What is claimed is:

1. A near-field electron laser producing laser light from the near-field energy of vibrating electrons, comprising a light source and a sealed container; wherein the working medium of the laser is electron; the interior of the sealed container is filled with an electron gas, the light source produces an incident light which is a parallel monochromatic light or a laser light, the average distance between electrons in the sealed container is much smaller than the wavelength of the incident light, the electron number density is much greater than the negative third power of the wavelength of the incident light, and the product of the number of electrons in the sealed container and the distance between the electrons is much greater than the wavelength of the incident light, so that the vibrating electrons are in the near-field of each other; the electric field intensity direction of the incident light and the electric moments of the vibrating electrons are in the same radial straight line and in the same direction, and there exists a radial attractive force among the vibrating electrons; the radial attractive force among the vibrating electrons is controlled by controlling the charge amount and amplitude of an accelerating charge that produces the incident light and the distance between the light source and the vibrating electrons, so that the average kinetic energy of the electrons for thermal motion is reduced to nearly zero, and cause the electrons to vibrate in the same radial straight line and in the same direction and have a constant frequency, amplitude and phase difference, and the interference effects of the radiation of various vibrating electrons are used to obtain a stronger directionality and intensity to form a laser light;

the incident light is produced by a vibrating electric dipole with a radiated electric field of $\vec{E(t)}$:

$$\vec{E(t)} = \frac{Qa}{4\pi\varepsilon_0 c^2 R}\omega^2 \cos\omega t$$

where Q is charge amount, a is amplitude, ω is frequency, $\varepsilon_0$ is a vacuum dielectric constant, c is a vacuum light speed, and R is the distance from an observation point to the centre of the vibrating electric dipole.

2. The near-field electron laser according to claim 1, wherein the sealed tube is evacuated first to remove impurities in the sealed tube, so that the pressure in the sealed tube is lower than 1 $P_a$, and then the electron gas is injected; during the injection of the electron gas, the electron gas is irradiated with light to produce an attractive force among the vibrating electrons and facilitate the injection of the electron gas; the sealed tube is made of glass or plastic.

* * * * *